United States Patent
Oji et al.

(10) Patent No.: US 10,889,150 B2
(45) Date of Patent: Jan. 12, 2021

(54) PNEUMATIC TIRE

(71) Applicant: SUMITOMO RUBBER INDUSTRIES, LTD., Kobe (JP)

(72) Inventors: Takuya Oji, Kobe (JP); Tatsuo Kimura, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 224 days.

(21) Appl. No.: 15/830,868

(22) Filed: Dec. 4, 2017

(65) Prior Publication Data

US 2018/0086151 A1 Mar. 29, 2018

Related U.S. Application Data

(62) Division of application No. 15/026,488, filed as application No. PCT/JP2014/076838 on Oct. 7, 2014, now Pat. No. 10,427,469.

(30) Foreign Application Priority Data

Oct. 22, 2013 (JP) ................................ 2013-219481
Mar. 26, 2014 (JP) ................................ 2014-064407

(51) Int. Cl.
  *B60C 11/01* (2006.01)
  *B60C 11/13* (2006.01)
  (Continued)

(52) U.S. Cl.
  CPC ...... *B60C 11/1307* (2013.01); *B60C 11/0306* (2013.01); *B60C 11/0332* (2013.01);
  (Continued)

(58) Field of Classification Search
  CPC .......... B60C 11/1307; B60C 11/0306
  See application file for complete search history.

(56) References Cited

U.S. PATENT DOCUMENTS

2004/0069389 A1* 4/2004 Ratliff, Jr. ........... B60C 11/0302
  152/209.15
2004/0238092 A1* 12/2004 Colombo ........... B29D 30/0606
  152/209.15
(Continued)

FOREIGN PATENT DOCUMENTS

EP  2537688 A2  12/2012
JP  2000-52715 A  2/2000
(Continued)

OTHER PUBLICATIONS

Michelin—https://www.benzworld.org/forums/sale-wanted-trade-giveaway/1424606-fs-w211-chrome-e55-e63-staggered.html (Year: 2009).*

(Continued)

*Primary Examiner* — Leith S Shafi
*Assistant Examiner* — Nicholas R Krasnow
(74) *Attorney, Agent, or Firm* — Birch, Stewart, Kolasch & Birch, LLP

(57) ABSTRACT

Provided is a pneumatic tire which has both improved driving stability performance on a dry road surface and improved on-snow performance. A pneumatic tire has defined on the tread first lands and second lands. The first lands and the second lands are provided with recesses. The recesses include first recesses provided in first edges of the first lands, and also include second recesses provided in second edges of the second lands. The second recesses are provided so as not to intersect projection regions formed by projecting the first recesses onto the second edges in the axial direction of the tire.

10 Claims, 11 Drawing Sheets

(51) Int. Cl.
*B60C 11/03* (2006.01)
*B60C 11/12* (2006.01)

(52) U.S. Cl.
CPC ...... *B60C 11/1236* (2013.01); *B60C 11/1392* (2013.01); *B60C 2011/0334* (2013.01); *B60C 2011/0341* (2013.01); *B60C 2011/0348* (2013.01); *B60C 2011/0355* (2013.01); *B60C 2011/0369* (2013.01); *B60C 2011/0383* (2013.01); *B60C 2011/1209* (2013.01); *B60C 2011/133* (2013.01)

(56) References Cited

U.S. PATENT DOCUMENTS

| | | | |
|---|---|---|---|
| 2006/0011279 A1* | 1/2006 | Miyasaka | B60C 11/0306 152/209.15 |
| 2008/0142133 A1* | 6/2008 | Ochi | B60C 11/13 152/209.8 |
| 2010/0186861 A1* | 7/2010 | Ishiguro | B60C 11/0306 152/209.25 |
| 2010/0212792 A1 | 8/2010 | Mita | |
| 2010/0314012 A1 | 12/2010 | Hada | |
| 2012/0060989 A1* | 3/2012 | Kuwajima | B60C 11/12 152/209.18 |
| 2012/0222788 A1 | 9/2012 | Nishiwaki | |
| 2012/0285592 A1* | 11/2012 | Kameda | B60C 11/1392 152/209.8 |
| 2012/0318420 A1* | 12/2012 | Sawai | B60C 11/042 152/209.15 |
| 2013/0192731 A1 | 8/2013 | Oji | |
| 2014/0137998 A1* | 5/2014 | Tanabe | B60C 11/1392 152/209.8 |
| 2014/0150941 A1* | 6/2014 | Takei | B60C 11/04 152/209.8 |
| 2014/0318676 A1 | 10/2014 | Kawakami | |
| 2015/0375571 A1* | 12/2015 | Koishikawa | B60C 11/0306 152/209.18 |
| 2016/0207359 A1* | 7/2016 | Nukushina | B60C 11/04 |

FOREIGN PATENT DOCUMENTS

| | | |
|---|---|---|
| JP | 2010-285035 A | 12/2010 |
| JP | 2012-218652 A | 11/2012 |
| JP | 2013-173521 A | 9/2013 |
| WO | WO 2013/077427 A1 | 5/2013 |

OTHER PUBLICATIONS

Extended European Search Report issued in European Application No. 14855219.3, dated May 17, 2017.
International Search Report, issued in PCT/JP2014/076838, dated Dec. 22, 2014.
Written Opinion of the International Searching Authority, issued in PCT/JP2014/076838 (PCT/ISA/237), dated Dec. 22, 2014.

* cited by examiner

PNEUMATIC TIRE

CROSS-REFERENCE TO RELATED APPLICATIONS

This application is a Divisional of copending application Ser. No. 15/026,488, filed on Mar. 31, 2016, which is the National Phase under 35 U.S.C. § 371 of International Application No. PCT/JP2014/076838, filed on Oct. 7, 2014, which claims the benefit under 35 U.S.C. § 119(a) to Patent Application No. 2013-219481, filed in Japan on Oct. 22, 2013 and Patent Application No. 2014-064407, filed in Japan on Mar. 26, 2014, all of which are hereby expressly incorporated by reference into the present application.

TECHNICAL FIELD

The present invention relates to a pneumatic tire which may improve on-snow performance with steering stability on dry road.

BACKGROUND ART

In recent years, pneumatic tires have been required an excellent traveling performance on snowy road (hereinafter, referred to as on-snow performance).

In order to improve on-snow performance, a pneumatic tire including a tread portion provided with a groove and a sipe has been proposed. Unfortunately, such a pneumatic tire had a problem that the steering stability on dry road tends to deteriorate owing to lowering of rigidity of the tread portion by the groove and the sipe.

The following Patent document 1 discloses a pneumatic tire including a recess provided on an edge of a land portion of a tread portion. Such a pneumatic tire may maintain rigidity of the land portion to ensure steering stability on dry road.

Unfortunately, the pneumatic tire disclosed by Patent document 1 has room for further improvement with respect to achieve the steering stability on dry road with on-snow performance.

Patent document 1: Japanese Unexamined Patent Application Publication No. 2000-52715

SUMMARY OF INVENTION

Technical Problem

The present invention has been made in view of circumstances described above, and has a main object to provide a pneumatic tire which achieves steering stability on dry road with on-snow performance based on improved arrangement of recesses provided on a land portion.

Solution to Problem

The present invention provides a pneumatic tire including a tread portion being provided with at least one circumferentially and continuously extending main groove to separate a first land portion located on one side of the main groove and a second land portion located on the other side of the main groove, a recess being provided on the first land portion and the second land portion, the recess including a plurality of first recesses provided on a first edge of the first land portion wherein the first edge faces the main groove and a plurality of second recesses provided on a second edge of the second land portion wherein the second edge faces the main groove, and each second recess being arranged so as not to overlap each projected region in which each first recess is projected onto the second edge in an axial direction of the tire.

In the pneumatic tire according to the invention, preferably, each recess includes a substantially tetrahedron void surrounded by four triangular surfaces, and the substantially tetrahedron including a first surface located on a ground contact surface of the first or second land portion, a second surface located on a groove wall of the main groove, a third surface forming a bottom side of the recess, and a fourth surface facing the second surface.

In the pneumatic tire according to the invention, preferably, the third surface is a spherical triangle surface that protrudes radially outwardly.

In the pneumatic tire according to the invention, preferably, the third surface of each first recess slopes radially inwardly toward one side in a circumferential direction of the tire, and the third surface of each second recess slopes radially inwardly toward the other side in the circumferential direction of the tire.

In the pneumatic tire according to the invention, preferably, the second land portion is provided with a lug groove having one end connected to the main groove and the other end terminates within the second land portion, and the lug groove is arranged so as to overlap with one of the projected regions of the first recesses.

In the pneumatic tire according to the invention, preferably, the second land portion is provided with a lateral groove on an opposite edge to the second edge, and the lateral groove is communicated with one of the second recesses.

In the pneumatic tire according to the invention, preferably, a maximum depth of the recess is in a range of from 0.5 to 0.95 times a depth of the main groove.

In the pneumatic tire according to the invention, preferably, a circumferential distance between the first recess and the second recess is in a range of from 0.9 to 1.1 times a width of the main groove.

The present invention also provides a pneumatic tire including a tread portion being provided with a plurality of circumferentially and continuously extending main grooves to form a land portion therebetween, a plurality of recesses being provided on the land portion, the recesses including a plurality of recesses provided on an axially one side edge of the land portion and a plurality of recesses provided on an axially other side edge of the land portion, and each recess provided on the one side edge is arranged so as not to overlap with each projected region in which each recess provided on the other side edge is projected onto the one side edge in an axial direction of the tire.

In the pneumatic tire according to the invention, preferably, the main grooves include a pair of circumferentially and continuously extending shoulder main grooves each deposed proximate each tread edge and a circumferentially and continuously extending crown main groove arranged between the shoulder main grooves to form second land portions each between the shoulder main groove and the crown main groove on each side of a tire equator, each second land portion is provided with a plurality of lug grooves extending axially outwardly from the crown main groove and terminating within the second land portion, a plurality of lateral grooves extending axially inwardly from the shoulder main groove and terminating within the second land portion and the second recess provided between a pair of circumferentially adjacent lug grooves on an edge on the side of the crown main groove of the second land portion, and the lug grooves and the lateral grooves are arranged alternately in a circumferential direction of the tire.

In the pneumatic tire according to the invention, preferably, the second recess includes a substantially triangular recess bottom surface, the recess bottom surface being smoothly connected to a ground contact surface of the second land portion, the recess bottom surface extending toward a bottom of the second recess while increasing a depth of the second recess and reducing a width of the recess bottom surface in the axial direction of the tire from the ground contact surface toward the bottom, the recess bottom surface includes a first side extending on a sidewall of the second land portion, a second side to define a boundary with respect to the ground contact surface, and a third side disposed between the first side and the second side, and the first side has a length greater than that of the third side.

In the pneumatic tire according to the invention, preferably, an angle between the second side and the third side is an obtuse angle.

In the pneumatic tire according to the invention, preferably, the second recess includes a recess sidewall extending radially outwardly from the third side in a substantially planar shape.

In the pneumatic tire according to the invention, preferably, the lateral grooves include a steep inclined portion having an angle with respect to the circumferential direction of the tire wherein the angle gradually decreases axially inwardly, and the second land portion is provided with a connection sipe connecting between the second recess and the steep inclined portion.

In the pneumatic tire according to the invention, preferably, a depth of the steep inclined portion gradually increases axially outwardly.

In the pneumatic tire according to the invention, preferably, circumferential arrangement pitches of lug grooves are greater than an axial width of the second land portion.

In the pneumatic tire according to the invention, preferably, the arrangement pitches are in a range of from 2.0 to 3.3 times the axial width of the second land portion.

In the pneumatic tire according to the invention, preferably, an inclined sipe extending axially inwardly from the shoulder main groove and terminating within the second land portion is provided.

Advantageous Effects of Invention

The pneumatic tire according to a first aspect of the invention includes the tread portion provided with at least one circumferentially and continuously extending main groove to separate the first land portion located on one side of the main groove and the second land portion located on the other side of the main groove. The recess is provided on the first land portion and the second land portion. Such a recess may compress snow introduced therein effectively, and then may generate large snow-shearing force by shearing the compressed snow. Thus, traction performance on snowy road can be improved.

The recess includes a plurality of first recesses provided on the first edge of the first land portion wherein the first edge faces the main groove and a plurality of second recesses provided on the second edge of the second land portion wherein the second edge faces the main groove. Each second recess is arranged so as not to overlap each projected region in which each first recess is projected onto the second edge in the axial direction of the tire. Such first and second recesses may ensure rigidity of land portions effectively to achieve an excellent steering stability on dry road while maintaining snow traction in the circumferential direction of the tire.

The pneumatic tire according to a second aspect of the invention includes the tread portion provided with a plurality of circumferentially and continuously extending main grooves to form a land portion therebetween. The land portion is provided with a plurality of recesses. The recesses include a plurality of recesses provided on an axially one side edge of the land portion and a plurality of recesses provided on an axially other side edge of the land portion. Such recesses may improve traction performance when traveling on snowy road by obtaining a large snow-shearing force on the snowy road.

Each recess provided on the one side edge is arranged so as not to overlap with each projected region in which each recess provided on the other side edge is projected onto the one side edge in the axial direction of the tire. Such recesses may ensure rigidity of the land portion effectively to achieve an excellent steering stability on dry road while maintaining snow traction in the circumferential direction of the tire.

Accordingly, the pneumatic tire in accordance with the present invention may achieve steering stability on dry road with on-snow performance.

REFERENCE SIGNS LIST

Figure 1:
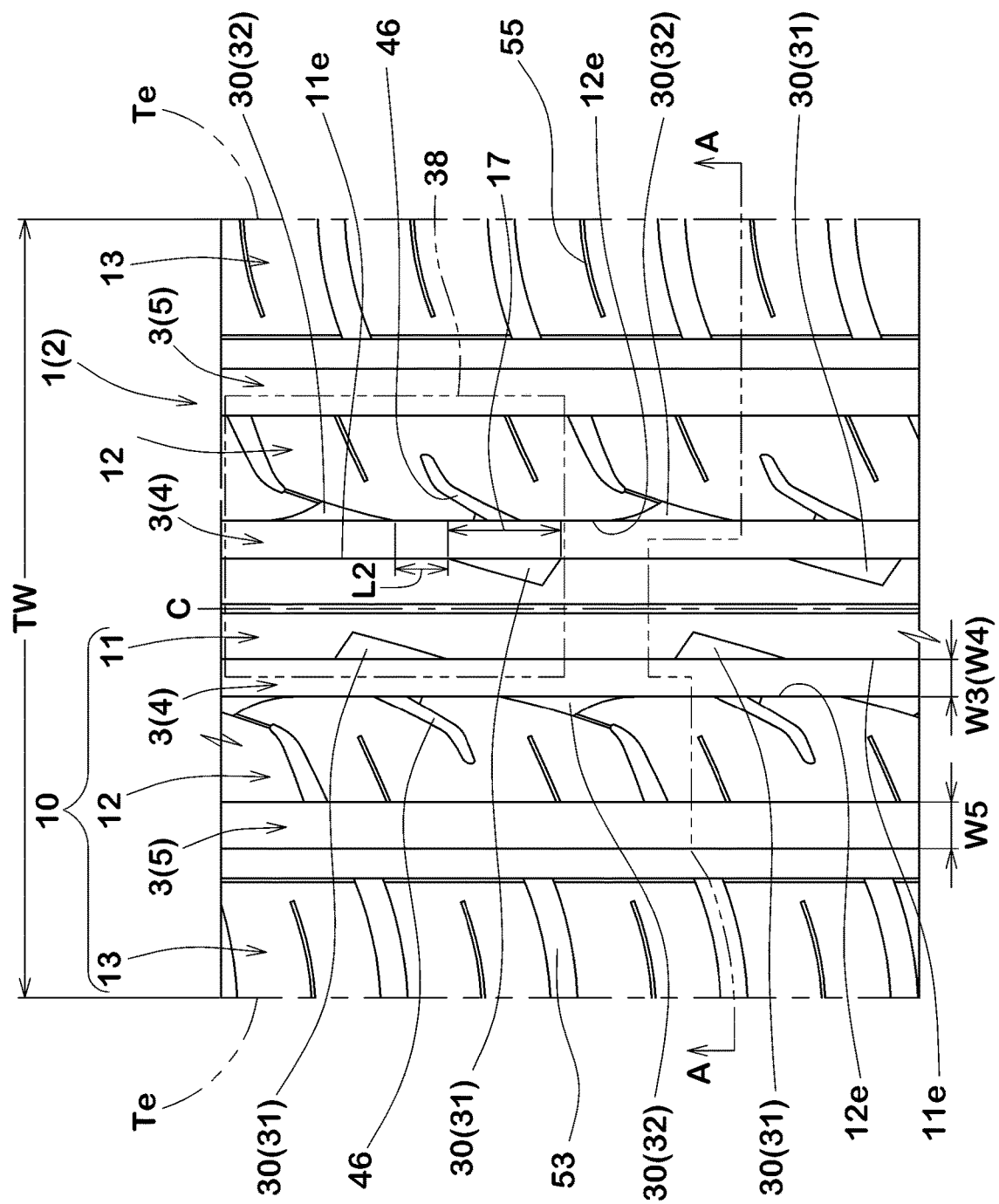
FIG. 1 is a development view of a tread portion of a pneumatic tire according to an embodiment of the invention.

2 Tread portion
3 Main groove
11 First land portion
12 Second land portion
11e First side
12e Second side
17 Projected region
30 Recess
31 First recess
32 Second recess

DESCRIPTION OF EMBODIMENTS

An embodiment of the present invention will be explained below to the accompanying drawings. FIG. 1 is a development view of a tread portion 2 of a pneumatic tire (hereinafter, simply referred to as "tire") 1 in accordance with an embodiment of the present invention. The pneumatic tire 1 according to the embodiment, for instance, is preferably embodied as a radial tire for passenger cars.

As illustrated in FIG. 1, the tread portion 2 is provided with a plurality of circumferentially and continuously extending main grooves 3. As used herein, "main groove" means a groove that extends continuously in a circumferential direction of the tire and has a width of 2% or more a tread width TW.

The tread width TW is an axial distance between tread edges Te and Te of the tire 1 placed under a standard state. The standard state is such that the tire is mounted on a standard wheel rim (not shown) with a standard pressure, but is loaded with no tire load.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

The tread edge is an axially outermost ground contact edge of a ground contact patch of the tire which is obtained by loading with a standard tire load on the tire placed under the standard state with at a camber angle of zero.

As used herein, the standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

The main grooves 3 include a crown main groove 4 and a shoulder main groove 5.

A pair of the shoulder main grooves 5 are arranged so that the tire equator C is located therebetween wherein each is located nearest to each tread edge Te. In this embodiment, the shoulder main grooves 5, for example, extend in a straight shape in the circumferential direction of the tire.

A pair of crown main grooves 4 are arranged between the shoulder main grooves 5 and 5 wherein the tire equator C is located between the crown main grooves 4. In this embodiment, the crown main grooves 4, for example, extend in a straight shape in the circumferential direction of the tire.

The widths W4 of the crown main grooves 4 and the widths W5 of the shoulder main grooves 5, for example, are preferably in a range of from 2.5% to 7.5% the tread width TW. These crown main grooves 4 and shoulder main grooves 5 may achieve steering stability on dry road with on-snow performance. In this embodiment, the widths W4 and W5 of the crown main grooves 4 and the shoulder main grooves 5 respectively are substantially constant.

Figure 2:
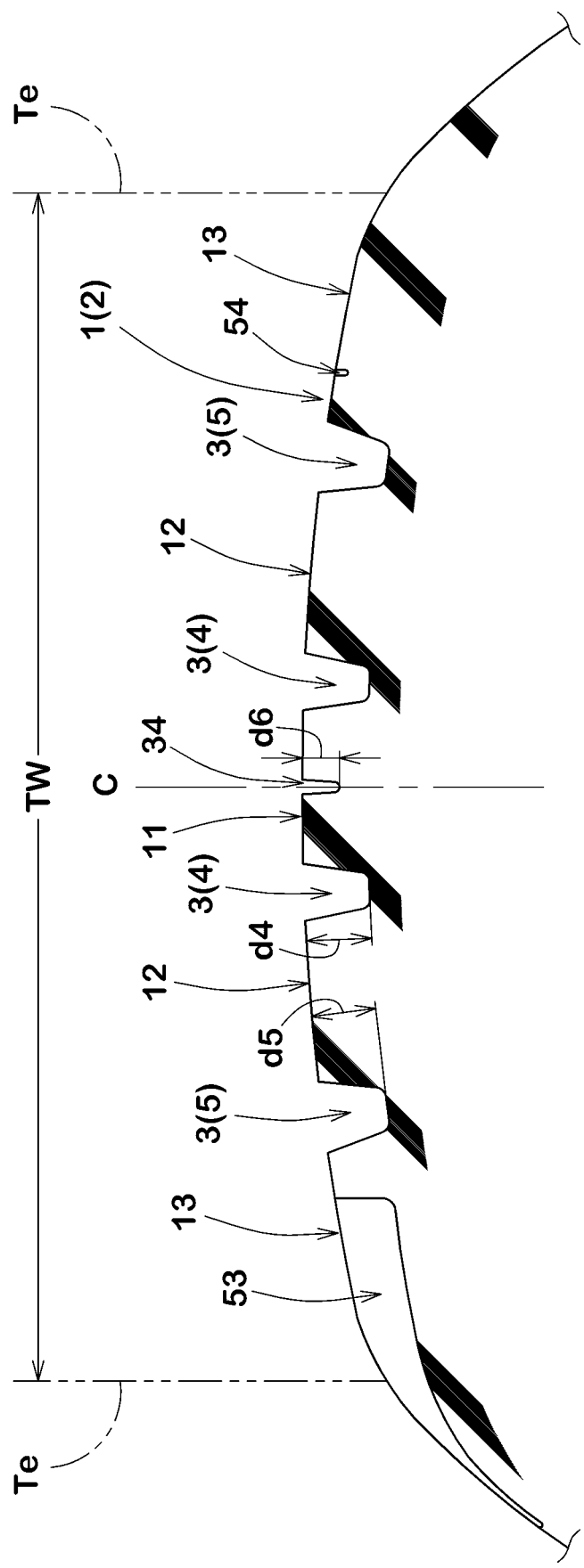
FIG. 2 is a cross-sectional view taken along a line A-A of FIG. 1.

FIG. 2 illustrates a cross-sectional view taken along a line A-A of FIG. 1. As illustrated in FIG. 2, the depths d4 of the crown main grooves 4 and the depths d5 of the shoulder main grooves 5, for example, are preferably in a range of from 5 to 15 mm as for a tire for passenger cars according to the embodiment.

As illustrated in FIG. 1, the tread portion 2 is separated into a plurality of land portions 10 between the main grooves 3 and 3 by providing a plurality of main grooves 3. The land portions 10, for example, include a first land portion 11, a pair of second land portion 12 and a pair of third land portions 13. In this embodiment, the first land portion 11 is disposed between a pair of the crown main grooves 4 and 4. Each of the second land portions 12 is disposed between one of the crown main grooves 4 and one of the shoulder main grooves 5. Each of the third land portions 13 is disposed axially outward of each shoulder main groove 5.

Figure 3:
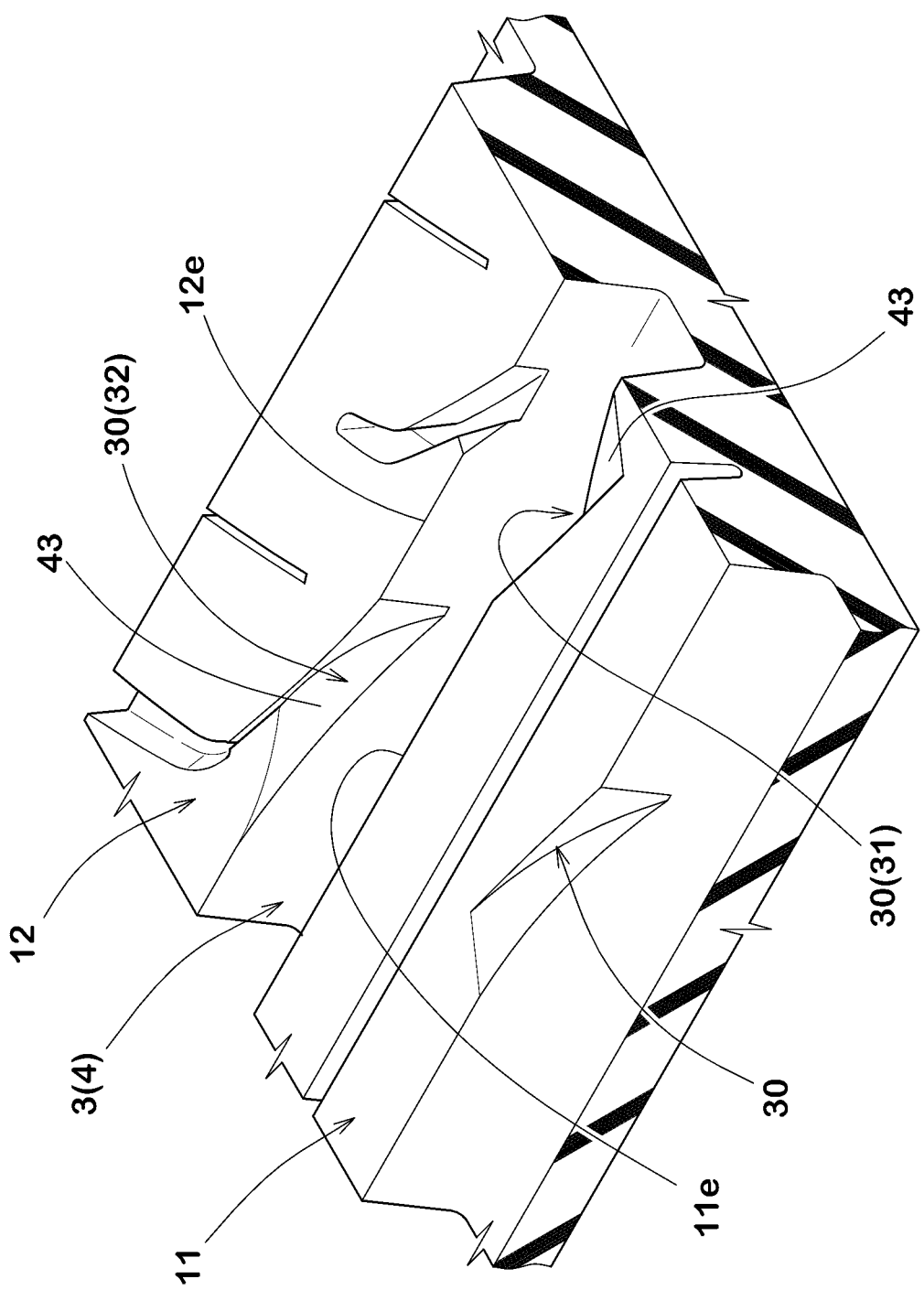
FIG. 3 is an enlarged perspective view of a main groove and a land portion illustrated in FIG. 1.

FIG. 3 illustrates an enlarged perspective view of a region 38 surrounded by two-dot chain line of FIG. 1. In FIG. 3, one of the crown main grooves 4 for the main grooves 3, the first land portion 11 located on one side of the crown main groove 4, and the second land portion 12 located on the other side of the crown main groove 4 are illustrated.

As illustrated in FIG. 3, each of the first land portion 11 and the second land portion 12 is provided with a plurality of recesses 30. The recesses 30 may compress snow introduced therein effectively, and then may generate large snow-shearing force by shearing the compressed snow. Thus, traction performance on snowy road can be improved.

As illustrated in FIG. 1, the recess 30 includes a plurality of first recesses 31 provided on a first edge 11e of the first land portion 11 wherein the first edge 11e faces the main groove 3 and a plurality of second recesses 32 provided on a second edge 12e of the second land portion 12 wherein the second edge 12e faces the main groove 3.

Each second recess 32 is arranged so as not to overlap each projected region 17 in which each first recess 31 is projected onto the second edge 12e in the axial direction of the tire. These first recesses 31 and second recesses 32 may ensure rigidity of land portions 10 effectively to achieve an excellent steering stability on dry road while maintaining snow traction in the circumferential direction of the tire.

Figure 4:
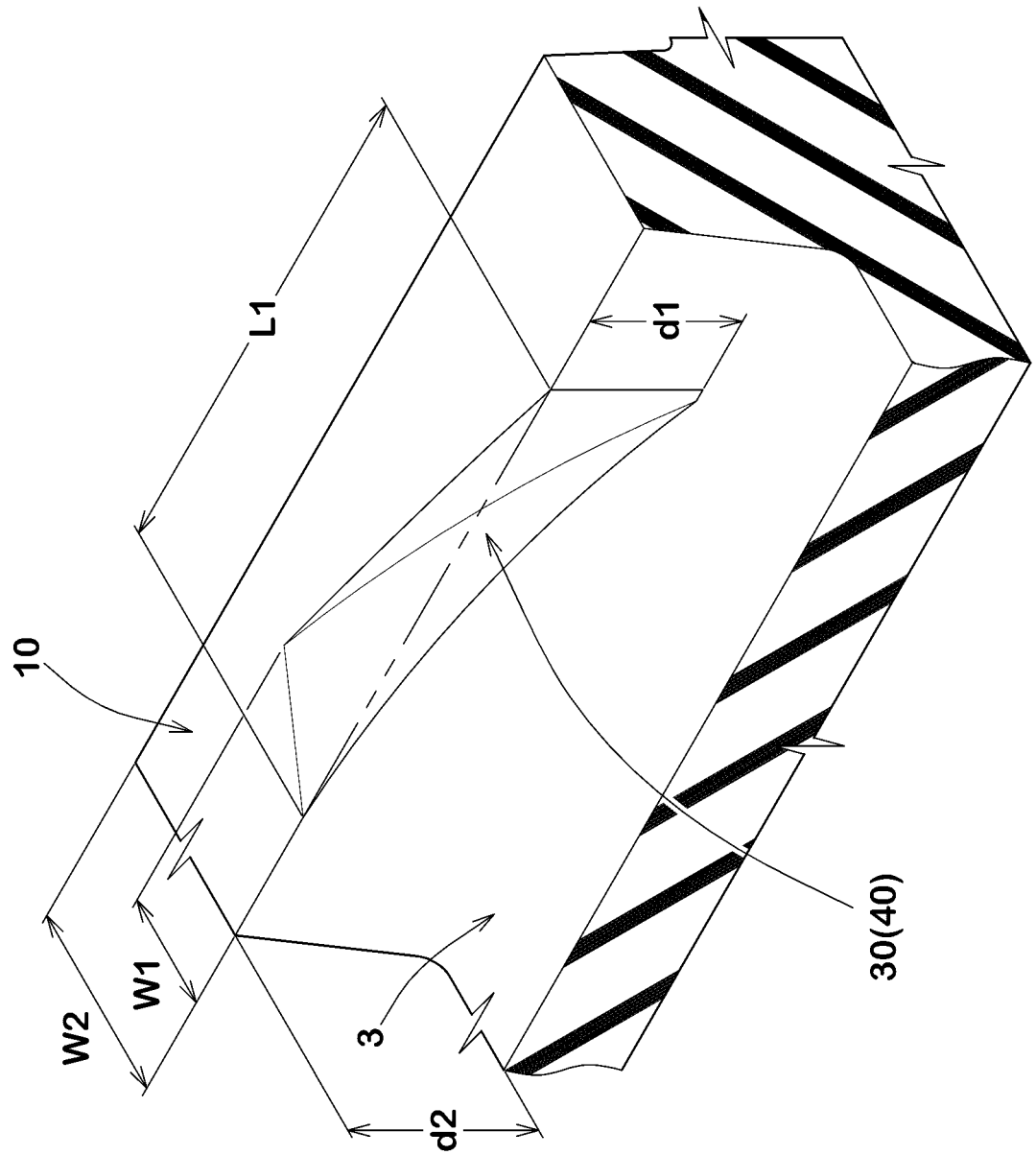
FIG. 4 is an enlarged perspective view of a recess illustrated in FIG. 3.
Figure 5A:
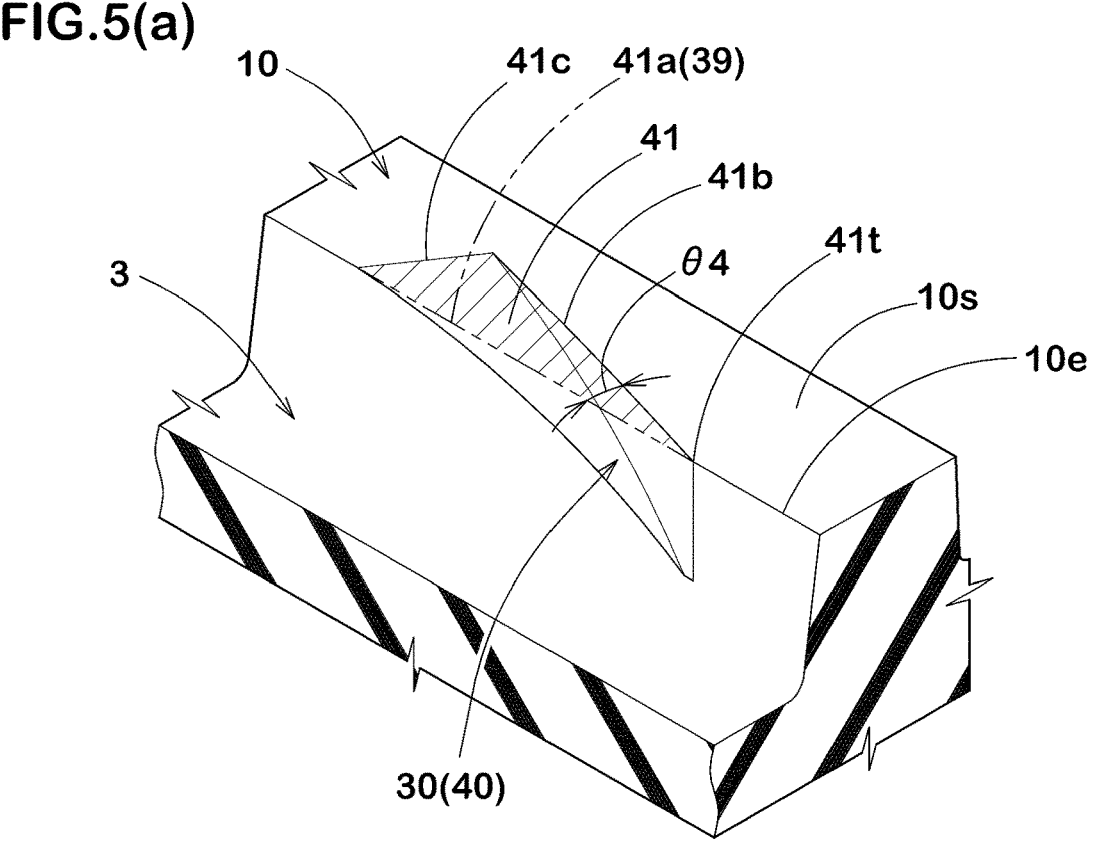
FIG. 5A is an enlarged perspective view of a first surface of the recess and FIG. 5B is an enlarged perspective view of a second surface of the recess.
Figure 5B:
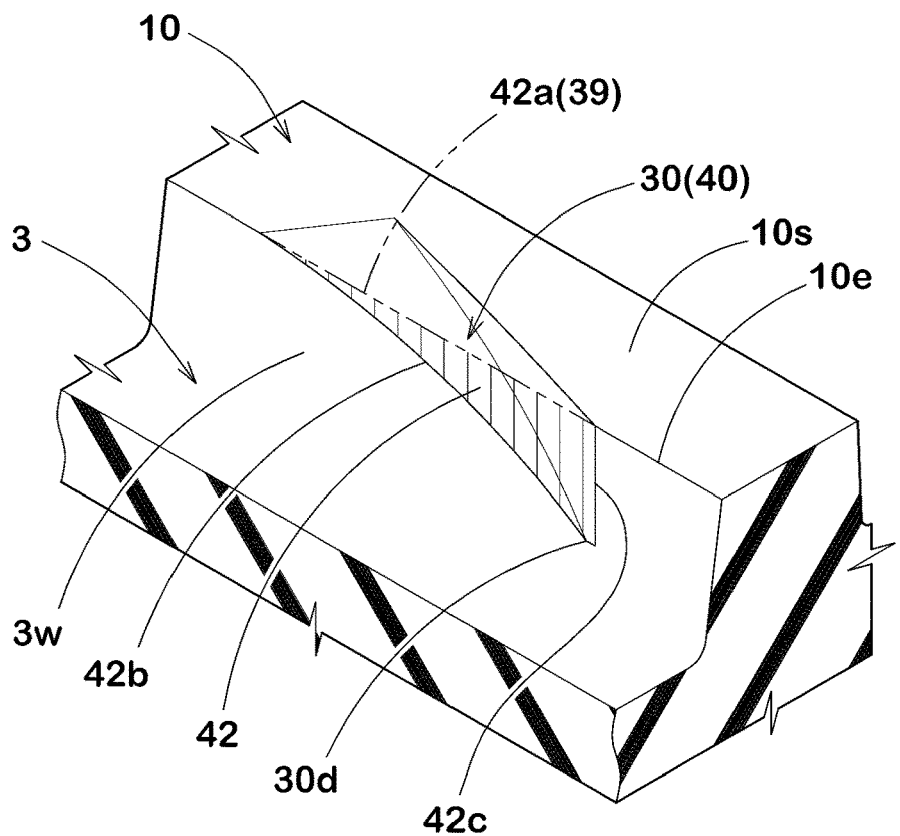
Figure 6A:
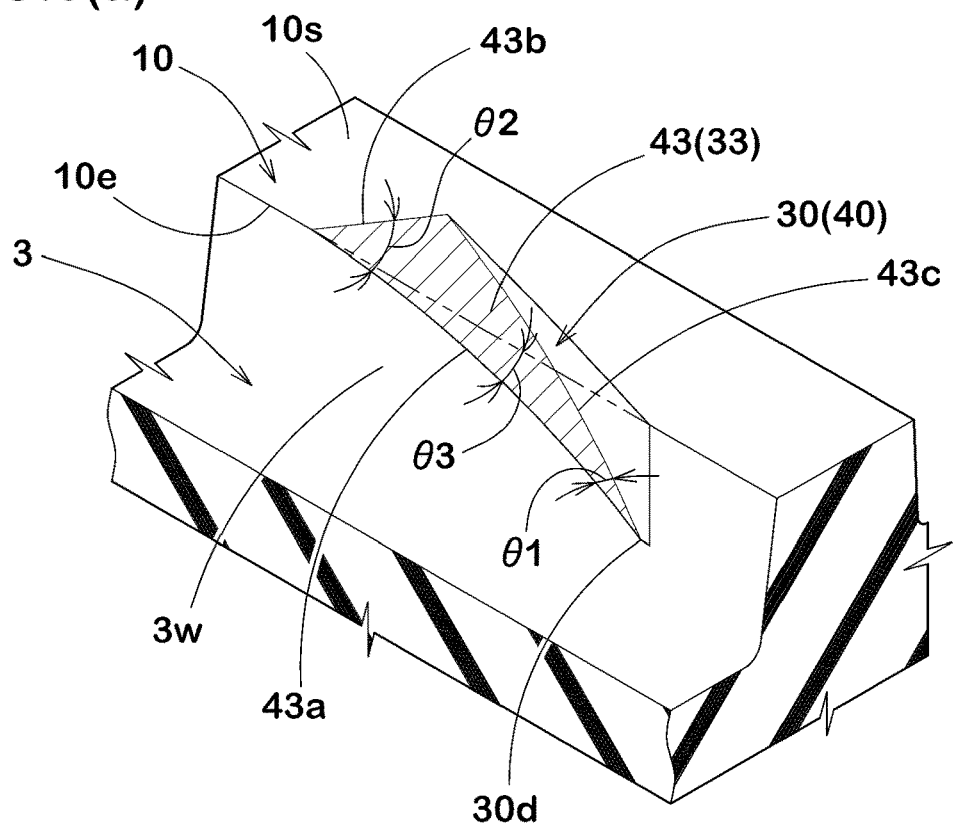
FIG. 6A is an enlarged perspective view of a third surface of the recess and FIG. 6B is an enlarged perspective view of a fourth surface of the recess.
Figure 6B:
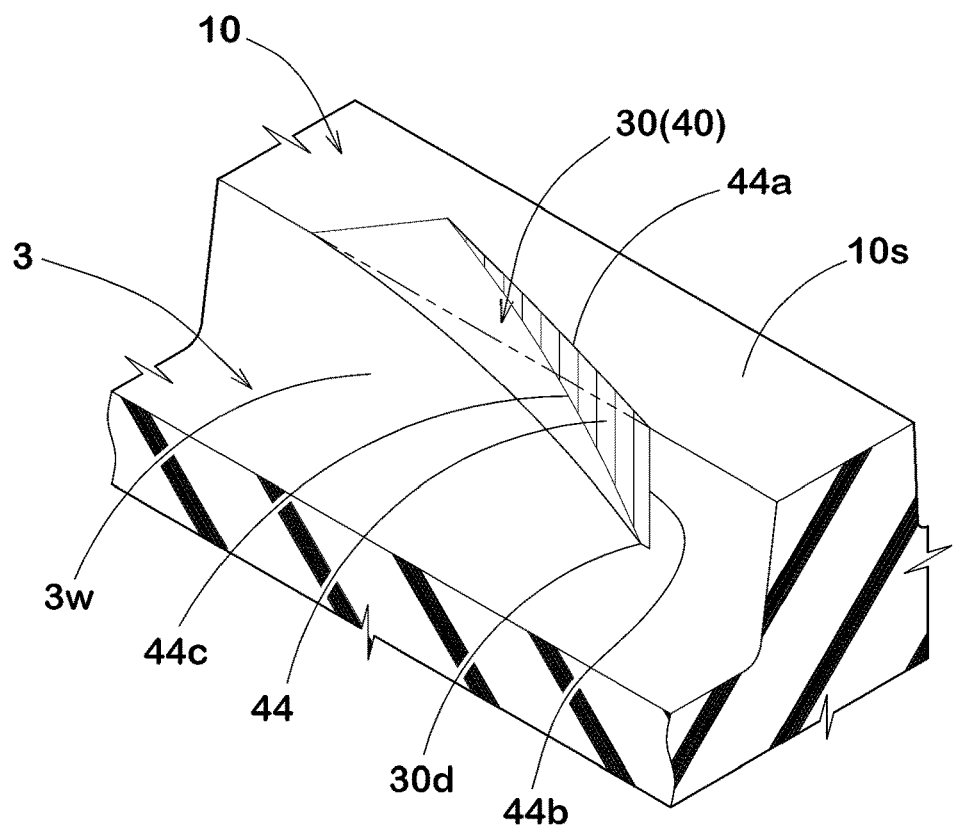

FIGS. 4 to 6 each illustrate an enlarged perspective view of the recesses 30. As illustrated in FIG. 4, the recess 30 is a void having a substantially tetrahedron shape 40 provided on the land portions 10 and which is surrounded by four triangular surfaces. As illustrated in FIGS. 5A, 5B, 6A and 6B, the substantially tetrahedron shape 40 includes a first surface 41, a second surface 42, a third surface 43 and a fourth surface 44.

As illustrated in FIG. 5A, the first surface 41 is located on the ground contact surface 10s of the land portion 10. The first surface 41 is indicated by hatching in FIG. 5A.

The first surface 41 has a triangular shape having a first side 41a, a second side 41b and a third side 41c. The first side 41a corresponds to a virtual extension 39 of the edge 10e and which extends along the circumferential direction of the tire. The second side 41b, for example, is shorter than the first side 41a, and extends on the ground contact surface 10s of the land portion 10 with an inclination with respect to the circumferential direction of the tire. The third side 41c, for example, is the shortest in three sides, and extends on the ground contact surface 10s of the land portion 10. The angle θ4 between the first side 41a and the second side 41b, for example, is in a range of from 5 to 30 degrees.

As illustrated in FIG. 5B, the second surface 42 is a surface located on a sidewall 3w of the main groove 3. The second surface 42 is indicated by hatching in FIG. 5B. The second surface 42 has a triangular shape including a first side 42a, a second side 42b and a third side 42c. The first side 42a is a virtual extension 39 of the edge 10e of the land portion 10, and corresponds to the first side 41a (shown in FIG. 5A) of the first surface 41. The second side 42b extends from the ground contact surface 10s of the land portion 10 to the deepest portion 30d of the recess on the sidewall 3w of the main groove 3 with an inclination with respect to the circumferential direction of the tire. The third side 42c is shorter than the first side 42a and the second side 42b, and extends in a depth direction of the main groove 3 within the sidewall 3w of the main groove 3.

As illustrated in FIG. 6A, the third surface 43 forms a bottom surface 33 of the recess 30. The third surface 43 is indicated by hatching in FIG. 6A.

Preferably, the third surface 43 is connected smoothly with the ground contact surface 10s of the land portion 10. The third surface 43 is inclined with respect to the ground contact surface 10s so as to increase the depth of the recess 30 in one side or the other side in the circumferential direction of the tire. In this embodiment, the third surface 43 is a spherical triangle surface that protrudes radially outwardly. Such a third surface 43 may introduce snow into the recess 30 when traveling on snowy road, and compress it effectively. Accordingly, an excellent traveling performance on-snow performance can be achieved by generating large snow-shearing force.

The third surface 43 includes a first side 43a, a second side 43b and a third side 43c. The first side 43a extends from the ground contact surface 10s of the land portion 10 to the deepest portion 30d of the recess on the sidewall 3w of the main groove 3 while inclining with respect to the circumferential direction of the tire. The first side 43a of the third surface 43 corresponds to the second side 43b (shown in FIG. 5B) of the second surface 42.

The second side 43b of the third surface 43 is the shortest side in the sides of the third surface 43, and which extends on the ground contact surface 10s of the land portion. The third side 43c extends from the ground contact surface 10s of the land portion 10 toward the deepest portion 30d of the recess while inclining with respect to the circumferential direction of the tire.

The vertex angle θ1 of the bottom surface 33 formed between the first side 43a and the third side 43c of the third surface 43 is preferably in a range of not less than 5 degrees, more preferably not less than 15 degrees, but preferably not more than 30 degrees, more preferably not more than 20 degrees. Thus, the recess may have a sufficient volume that may compress the snow introduced in the recess 30 effectively.

The edge side angle θ2 of the bottom surface 33 formed between the first side 43a and the second side 43b of the third surface 43 is preferably in a range of not less than 45 degrees, more preferably not less than 60 degrees, but preferably not more than 90 degrees, more preferably not more than 75 degrees. Such a bottom surface 33 may introduce snow into the recess 30 effectively when cornering, and therefore cornering performance on snowy road can be improved.

The inclined angle θ3 formed between the first surface 41 (shown in FIG. 5A) and the third surface 43 is preferably in a range of not less than 5 degrees, more preferably not less than 8 degrees, but preferably not more than 15 degrees, more preferably not more than 12 degrees. Such a third surface 43 may maintain a sufficient volume of the recess 30 while ensuring rigidity of the land portion. Thus, the steering stability on dry road as well as on-snow performance can be improved.

Preferably, the inclined angle θ3 increases toward the deepest portion 30d of the recess 30 from the side of the ground contact surface 10s. With this, the snow introduced in the recess 30 is compressed more effectively when traveling on snowy road. Accordingly, a large snow-shearing force may be obtained and offer an excellent on-snow performance.

As illustrated in FIG. 6B, the fourth surface 44 is a surface on the side of the land portion 10 and which faces the second surface 42 (shown in FIG. 5B). The fourth surface 44 is indicated by hatching in FIG. 6B.

The fourth surface 44 is connected substantially vertically to the third surface 43 (shown in FIG. 6A). The fourth surface 44 extends along the radial direction of the tire. The fourth surface 44, for example, is formed as a flat surface or a curved surface that is bent smoothly. Such a fourth surface 44 may compress snow introduced in the recess 30 along the third surface strongly toward the main groove 3 when traveling on snowy road. Accordingly, a large snow-shearing force may be obtained, and in particular cornering performance on snowy road can be improved.

The fourth surface 44 has a triangular shape including a first side 44a, a second side 44b and a third side 44c. The first side 44a extends on the ground contact surface 10s of the land portion 10 with an inclination with respect to the circumferential direction of the tire. The second side 44b extends on the sidewall 3w of the main groove 3 in the depth direction of the main groove 3. The third side 44c extends from the ground contact surface 10s of the land portion 10 toward the deepest portion 30d of the recess 30 while inclining with respect to the circumferential direction of the tire.

As illustrated in FIG. 4, the width W1 of the recess 30 in the axial direction of the tire is preferably in a range of not less than 0.2 times, more preferably not less than 0.25 times, but preferably not more than 0.4 times, more preferably not more than 0.35 times the width W2 of the land portion 10 on which the recess 30 is provided. Such a recess 30 may improve on-snow performance while ensuring rigidity of the land portion 10.

A ratio W1/L1 of the axial width W1 of the recess 30 to the circumferential length L1 of the recess is preferably in a range of not less than 0.15, more preferably not less than 0.18, but preferably not more than 0.25, more preferably not more than 0.22. Such a recess 30 may improve traction on snowy road as well as cornering performance in a well balanced manner.

The maximum depth d1 of the recess 30 is preferably in a range of not less than 0.5 times, more preferably not less than 0.6 times, but preferably not more than 0.95 times, more preferably not more than 0.75 times the depth d2 of the main groove 3. Such a recess 30 may achieve the steering stability on dry road with on-snow performance.

As illustrated in FIG. 1, a circumferential length L2 between circumferentially adjacent first recess 31 and the second recess 32 is preferably in a range of not less than 0.9 times, more preferably not less than 0.95 time, but preferably not more than 1.1 times, more preferably not more than 1.05 times the width W3 of the main groove 3. These first recess 31 and second recess 32 may achieve a large snow-shearing force while maintaining rigidity uniformity of the land portion 10.

As illustrated in FIG. 3, preferably, the third surface 43 of the first recess 31 is inclined radially inwardly toward one side in the circumferential direction of the tire, and the third surface 43 of the second recess 32 is inclined radially inwardly toward the other side in the circumferential direction of the tire. These first recess 31 and second recess 32 may obtain a large snow-shearing force in both situations of acceleration and braking. Accordingly, on-snow performance can be further improved.

Figure 7:
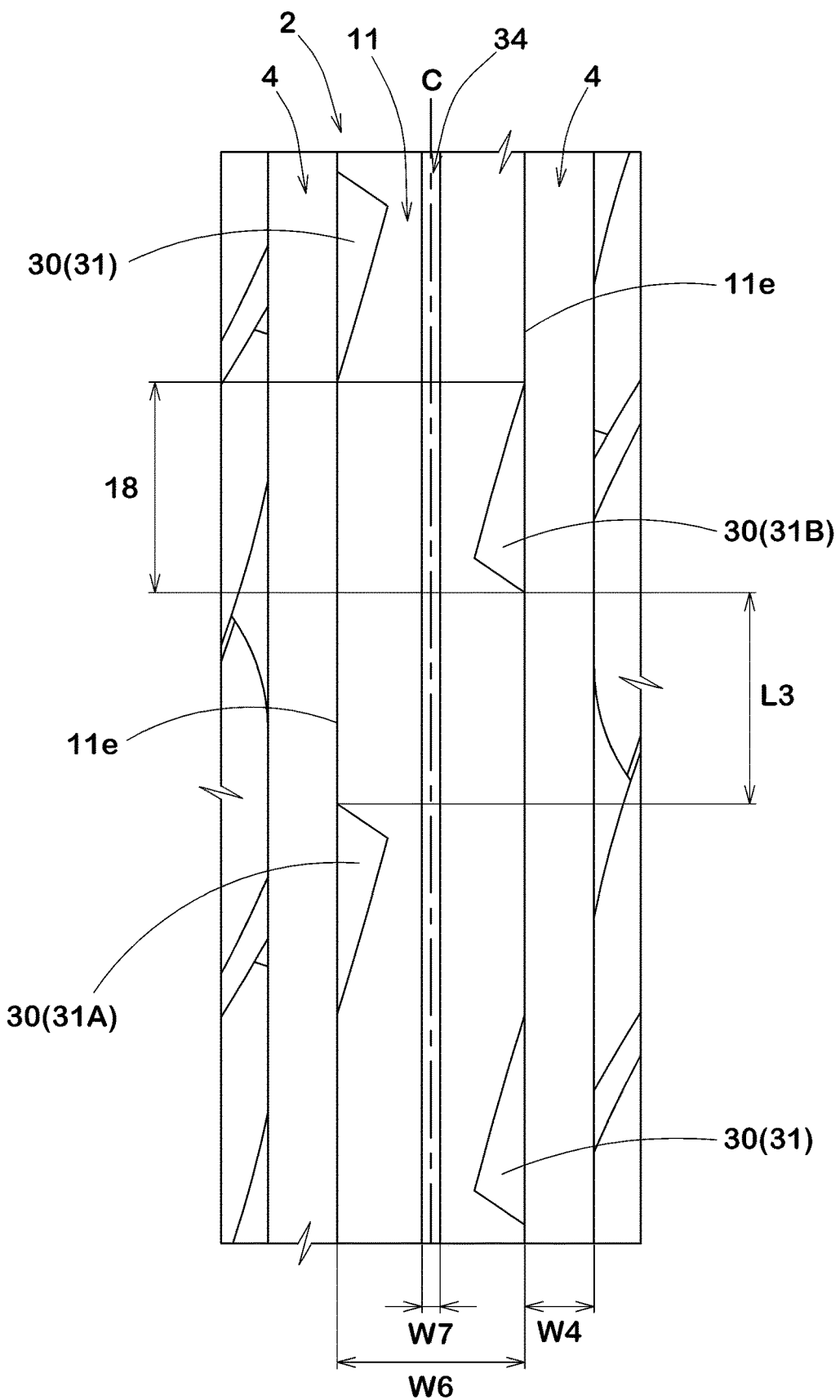
FIG. 7 is an enlarged view of a first land portion illustrated in FIG. 1.

FIG. 7 illustrates a partial enlarged view of the first land portion 11. The tread portion 2 according to the present embodiment is designed as a point symmetrical pattern with respect to an arbitrary point on the tire equator C. Accordingly, a plurality of the recesses 30 are provided on the both first edges 11e of the first land portion 11, as shown in FIG. 7. Such recesses 30 may obtain a large snow-shearing force from around the tire equator where a large ground contact pressure acts when traveling on snowy road, and may further improve snow traction.

Each first recess 31A provided on the one side of the first edge 11e is arranged so as not to overlap with each projected region 18 in which each first recess 31B provided on the other side of the first edge 11e is projected onto the one side of the first edge 11e. Such recesses 30 may ensure rigidity of the land portion on which recesses are provided effectively to achieve an excellent steering stability on dry road while maintaining snow traction in the circumferential direction of the tire.

A circumferential distance between the first recess 31A provided on the one side of the first edge 11e and the first recess 31B provided on the other side of the first edge 11e is preferably in a range of not less than 1.05 times, more preferably not less than 1.1 times, but preferably not more than 1.2 times, more preferably not more than 1.15 times the width W6 of the first land portion 11. Such recess 30 may maintain a large snow-shearing force while ensuring rigidity uniformity of the first land portion 11.

In this embodiment, the first land portion 11 is preferably formed as a rib extending continuously in the circumferential direction of the tire. The width W6 of the first land portion 11 in the axial direction of the tire, for example, is in a range of from 0.1 to 0.15 times the tread width TW (shown in FIG. 1, hereinafter the same). Such a first land portion 11 may offer an excellent steering stability due to its high circumferential rigidity.

Preferably, a circumferentially and continuously extending circumferential sub groove 34 is provided on a central region of the first land portion 11. In this embodiment, the circumferential sub groove 34 extends in a straight manner on the tire equator C. The circumferential sub groove 34 may compress snow effectively when traveling on snowy road. Accordingly, cornering performance on snowy road can be improved.

The width W7 of the circumferential sub groove 34, for example, is preferably in a range of from 6% to 12% the width W6 of the first land portion 11. The depth d6 (shown in FIG. 2) of the circumferential sub groove 34, for example, is in a range of from 4 to 6 mm. The circumferential sub groove 34 may offer an excellent on-snow performance while ensuring rigidity of the first land portion 11.

Figure 8:
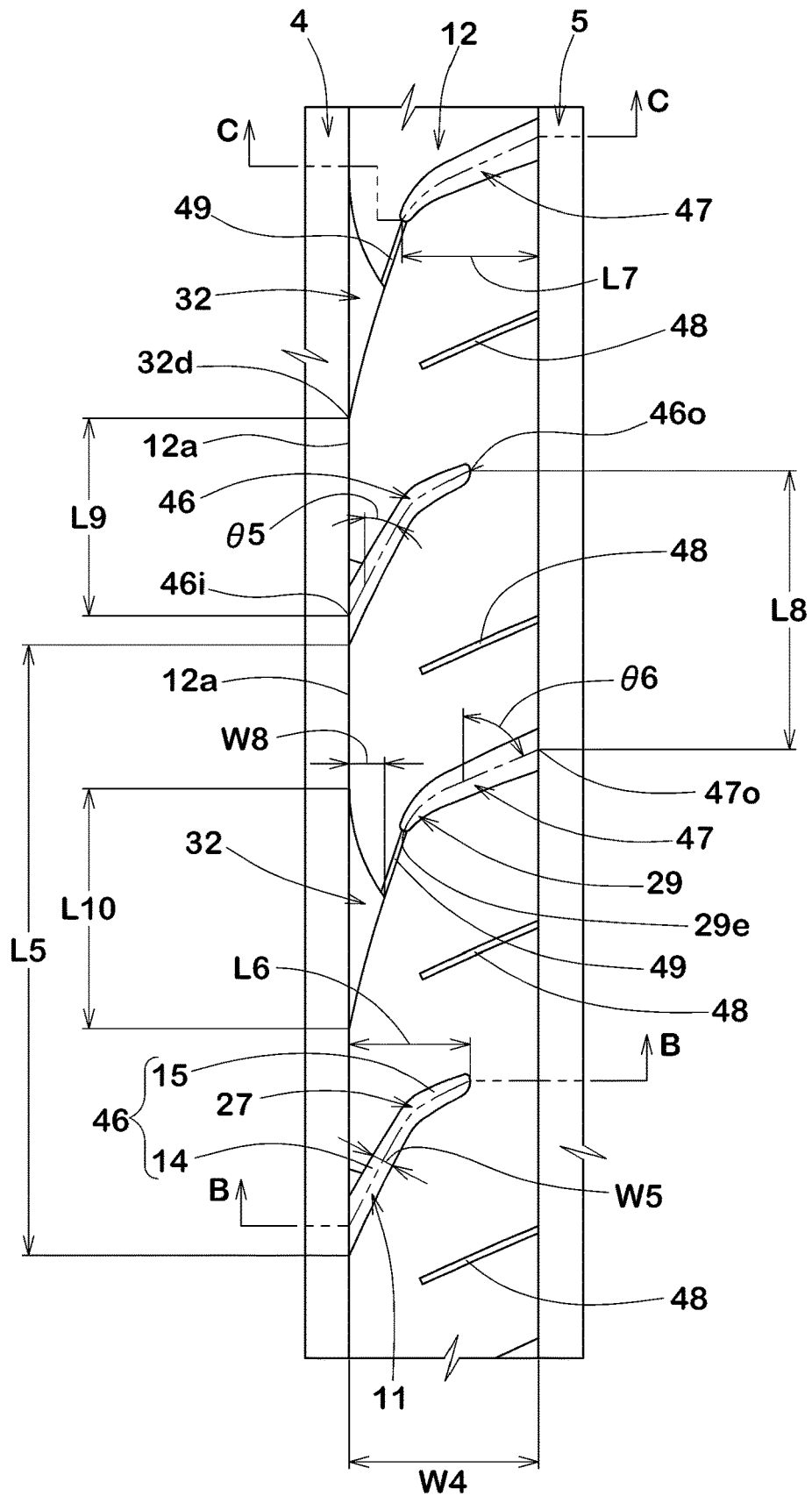
FIG. 8 is an enlarged view of a second land portion illustrated in FIG. 1.

FIG. 8 illustrates an enlarged view of the second land portion 12. As illustrated in FIG. 8, the second land portion 12 is provided with a plurality of lug grooves 46 extending axially outwardly from the crown main groove 4 and terminating within the second land portion 12, a plurality of lateral grooves 47 extending axially inwardly from the shoulder main groove 5 and terminating within the second land portion 12 and a second recess 32 provided on the edge 12a at the side of the crown main groove 4 of the second land portion 12.

These lug grooves 46 and lateral grooves 47 may improve on-snow performance while ensuring an excellent uneven wear resistance by maintaining the central region rigidity of the second land portion 12. Furthermore, the second recess 32 with the crown main groove 4 may compress snow strongly when traveling on snowy road. Thus, a large snow-shearing force may be maintained and improve on-snow performance.

The lug grooves 46 and the lateral grooves 47 are arranged alternately in the circumferential direction of the tire. With this, the rigidity of the second land portion 12 may be uniform, and suppress uneven wear of the second land portion 12.

In order to improve the effect described above further, the arrangement pitches L5 of the lug grooves 46 are preferably greater than the axial width W4 of the second land portion 12. With this, wear resistance can further be improved.

The arrangement pitches L5 of the lug grooves 46 are preferably in a range of not less than 2.0 times, more preferably not less than 2.5 times, but preferably not more than 3.3 times, more preferably not more than 3.0 times the width W4 of the second land portion 12. With this, uneven wear resistance as well as on-snow performance can be improved in a well balanced manner.

The lug grooves 46, for example, are inclined with respect to the circumferential direction of the tire. The lug grooves 46 according to the embodiment, for example, are bent within the second land portion 12. Each of the lug grooves 46, for example, includes a first portion 14 located axially inward of a bent portion 27 and a second portion 15 located axially outward of the bent portion 27.

The angle θ5 of the first portion 14, for example, is in a range of from 30 to 70 degrees with respect to the circumferential direction of the tire. The second portion 15, for example, is inclined at an angle with respect to the circumferential direction of the tire, and the angle is greater than that of the first portion 14. These first portion 14 and second portion 15 may improve steering stability while maintaining rigidity of the central region of the second land portion 12.

Preferably, widths W5 of the lug grooves 46 decrease gradually axially outwardly. Such lug grooves 46, for example, may offer an excellent wear resistance while ensuring rigidity of the second land portion 12.

Lengths L6 of the lug grooves 46 in the axial direction of the tire are preferably in a range of not less than 0.6 times, more preferably not less than 0.65 times, but preferably not more than 0.75 times, more preferably not more than 0.7 times the width W4 of the second land portion 12. These lug grooves 46 may improve wear resistance as well as on-snow performance in a well balance manner.

Figure 9A:
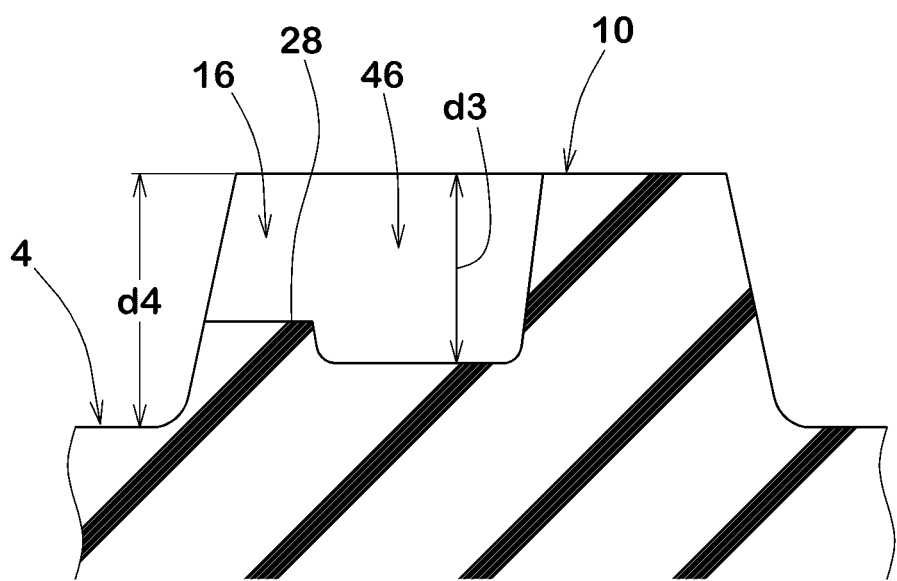
FIG. 9A is a cross-sectional view of a lug groove taken along a line B-B of FIG. 8.

FIG. 9A illustrates a cross-sectional view of the lug groove 46 taken along a line B-B of FIG. 8. As illustrated in FIG. 9A, the lug grooves 46 is preferably provided with a tie-bar 28 at the axially inner portion 16 wherein the tie-bar 28 raises its groove bottom. The tie-bar 28 may suppress uneven wear around the axially inner portion 16 of the lug grooves 46 effectively.

The maximum depth d3 of the lug grooves 46 is preferably in a range of not less than 0.55 times, more preferably not less than 0.65 times, but preferably not more than 0.8 times, more preferably not more than 0.7 times the depth d4 of the crown main groove 4. Such lug grooves 46 may improve wear resistance as well as on-snow performance in a well balanced manner.

As illustrated in FIG. 8, each of the lateral grooves 47, for example, is inclined in the same direction as the lug grooves 46. The angle θ6 of the lateral groove 47 is preferably in a range of not less than 30 degrees, more preferably not less than 40 degrees, but preferably not more than 70 degrees, more preferably not more than 60 degrees with respect to the circumferential direction of the tire. Such lateral grooves 47 may generate snow-shearing force in a well balanced manner in the circumferential direction of the tire as well as in the axial direction of the tire when traveling on snowy road.

Each of the lateral grooves 47, for example, includes a steep inclined portion 29 having an angle with respect to the circumferential direction of the tire wherein the angle gradually decreases axially inwardly. With this, uneven wear around the steep inclined portion 29 can be prevented.

Figure 9B:
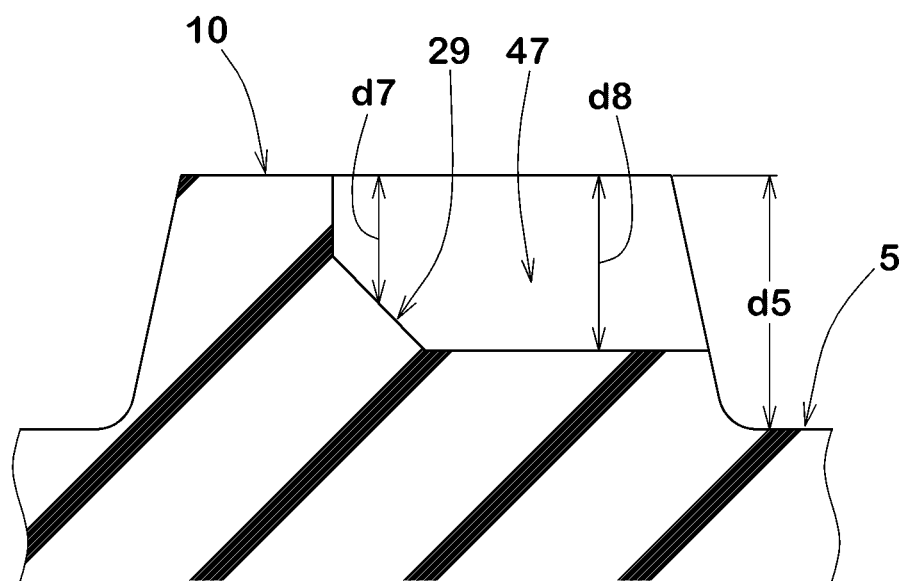
FIG. 9B is a cross-sectional view of a lateral groove taken along a line C-C of FIG. 8.

FIG. 9B illustrates a cross-sectional view of the lateral groove 47 taken along a line C-C of FIG. 8. As illustrated in FIG. 9B, the depth d7 of the lateral groove 47, for example, preferably increases axially outwardly. Such a steep inclined portion 29 may maintain the central region rigidity of the second land portion 12 to achieve an excellent wear resistance.

The maximum depth d8 of the lateral groove 47 is preferably in a range of not less than 0.55 times, more preferably not less than 0.65 times, but preferably not more than 0.8 times, more preferably not more than 0.7 times the depth d5 of the shoulder main groove 5. Such a lateral groove 47 may offer an excellent wet performance while ensuring steering stability.

As illustrated in FIG. 8, the length L7 of the lateral groove 47 in the axial direction of the tire is preferably in a range of not less than 0.6 times, more preferably not less than 0.65 times, more preferably not more than 0.75 times, more preferably not more than 0.7 times the axial width W4 of the second land portion 12. Such a lateral groove 47 may improve wear resistance and on-snow performance in a well balanced manner.

In the same point of view, the circumferential distance L8 between the axially outer end 47o of the lateral groove 47 and the axially outer end 46o of the lug groove 46 closest to the axially outer end 47o is preferably in a range of not less than 0.35 times, more preferably not less than 0.4 times, but preferably not more than 0.55 times, more preferably not more than 0.5 times the arrangement pitches L5 of the lug grooves 46.

Figure 10:
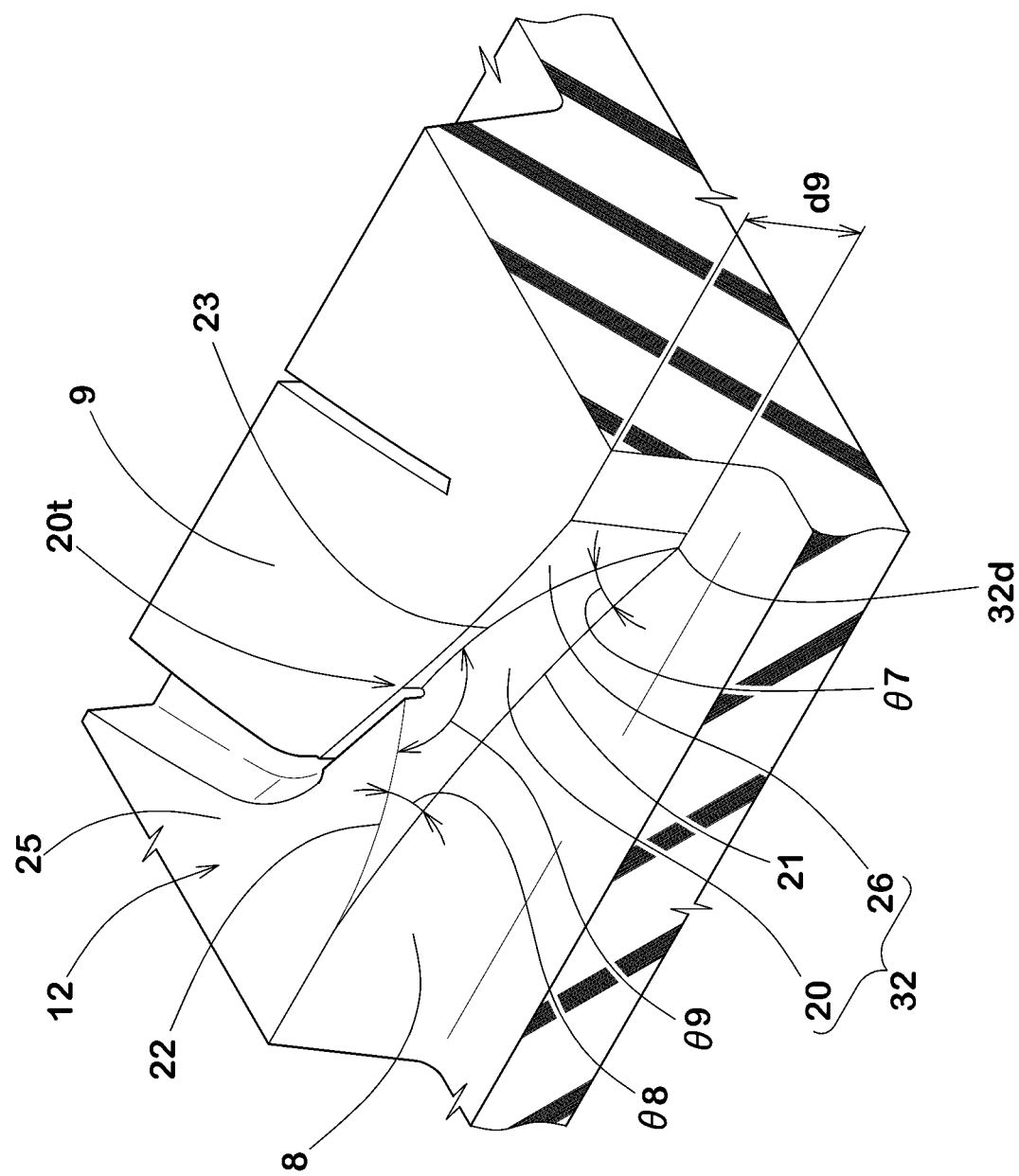
FIG. 10 is an enlarged perspective view of a second recess illustrated in FIG. 8.

FIG. 10 illustrates an enlarged perspective view of the second recess 32. As illustrated in FIG. 10, the second recess 32, for example, includes a recess bottom surface 20 and a recess sidewall 26 extending from the recess bottom surface 20 to the ground contact surface 25 of the second land portion 12.

The recess bottom surface 20, for example, is connected to the ground contact surface 25 of the second land portion 12, and extends toward the bottom 32d of the second recess 32 while increasing the depth of the second recess 32 gradually. The recess bottom surface 20, for example, has a substantially triangular shape having an axial width decreasing gradually from the ground contact surface toward the bottom 32d. In this embodiment, the recess bottom surface 20 is a spherical triangle surface that protrudes radially outwardly. Such a recess bottom surface 20 may generate a large snow-shearing force by introducing snow into the second recess 32 effectively when traveling on snowy road.

The recess bottom surface 20 includes a first side 21 extending on the sidewall 8 of the second land portion 12, a second side 22 which is a boundary to the ground contact surface 25 of the second land portion 12 and a third side 23 located between the first side 21 and the second side 22.

The length of the first side 21, for example, is preferably longer than those of the second side 22 and the third side 23. Such a second recess 32 with the crown main groove 4 may form a large snow column to improve on-snow performance.

The angle θ7 between the first side 21 and the third side 23 is preferably in a range of not less than 10 degrees, more preferably not less than 15 degrees, but preferably not more than 30 degrees, more preferably not more than 25 degrees. When the angle θ7 is less than 10 degrees, a sufficient volume of the second recess 32 may not be obtained. When the angle θ7 is more than 30 degrees, the second land portion 12 may be worn easily.

The angle θ8 between the first side 21 and the second side 22 is preferably in a range of not less than 25 degrees, more preferably not less than 30 degrees, but preferably not more than 35 degrees, more preferably not more than 40 degrees. With this, when traveling on snowy road, the snow tends to be introduced into the second recess 32 easily.

The second side 22, for example, is an arc shape protruding toward the bottom 32d of the second recess 32. Thus, uneven wear around the second side 22 can be prevented.

The angle θ9 between the second side 22 and the third side 23, for example, is preferably an obtuse angle. With this, uneven wear around the vertex angle 20t of the recess bottom surface 20 formed between the second side 22 and the third side 23 can be prevented.

The recess sidewall 26, for example, extends radially outwardly from the third side 23 of the recess bottom surface 20 in a substantially planar shape. When traveling on snowy road, the recess sidewall 26 may compress the snow introduced in the second recess 32 axially inwardly to improve steering stability on snowy road.

The depth d9 of the second recess 32 from the ground contact surface 25 of the second land portion 12 to the bottom 32d of the second recess 32 is preferably in a range of not less than 0.5 times, more preferably not less than 0.6 times, but preferably not more than 0.85 times, more preferably not more than 0.75 times the depth d4 of the crown main groove 4 (shown in FIG. 2). Such a second recess 32 may improve wet performance while maintaining steering stability.

As illustrated in FIG. 8, the circumferential distance L9 between the bottom 32d of the second recess 32 and the axially inner end 46i of the lug groove 46 closest to the bottom 32d is preferably in a range of not less than 0.25 times, more preferably not less than 0.3 times, but preferably not more than 0.45 times, more preferably not more than 0.4 times the arrangement pitches L5 of the lug grooves 46. With this, the rigidity of an axially inner portion of the second land portion 12 may be maintained, and therefore wear resistance thereof can be maintained.

The width W8 of the second recess 32 in the axial direction is preferably in a range of not less than 0.1 times, more preferably not less than 0.15 times, but preferably not more than 0.3 times, more preferably not more than 0.25 times the axial width W4 of the second land portion 12. Such a second recess 32 may improve wear resistance and on-snow performance in a well balanced manner.

In the same point of view, the circumferential length L10 of the second recess 32 is preferably in a range of not less than 0.3 times, more preferably not less than 0.35 times, but preferably not more than 0.5 times, more preferably not more than 0.45 times the arrangements pitches L5 of the lug grooves 46.

The second land portion 12 according to the embodiment, for example, is provided with a plurality of connection sipes 49 and inclined sipes 48. Each connection sipe 49, for example, connects between one of the second recesses 32 and one of the steep inclined portions 29 of the lateral grooves 47. In this embodiment, the connection sipe 49 is connected to the axially inner end 29e of the steep inclined portion 29. The inclined sipe 48, for example, extends axially inwardly from the shoulder main groove 5, and terminates within the second land portion 12. These connection sipe 49 and inclined sipe 48 may prevent uneven wear of the second land portion 12 by uniforming the rigidity distribution of the second land portion 12. In this description, the "sipe" means a cut having a width less than 1.0 mm, and is distinguished from a groove for draining water.

Figure 11:
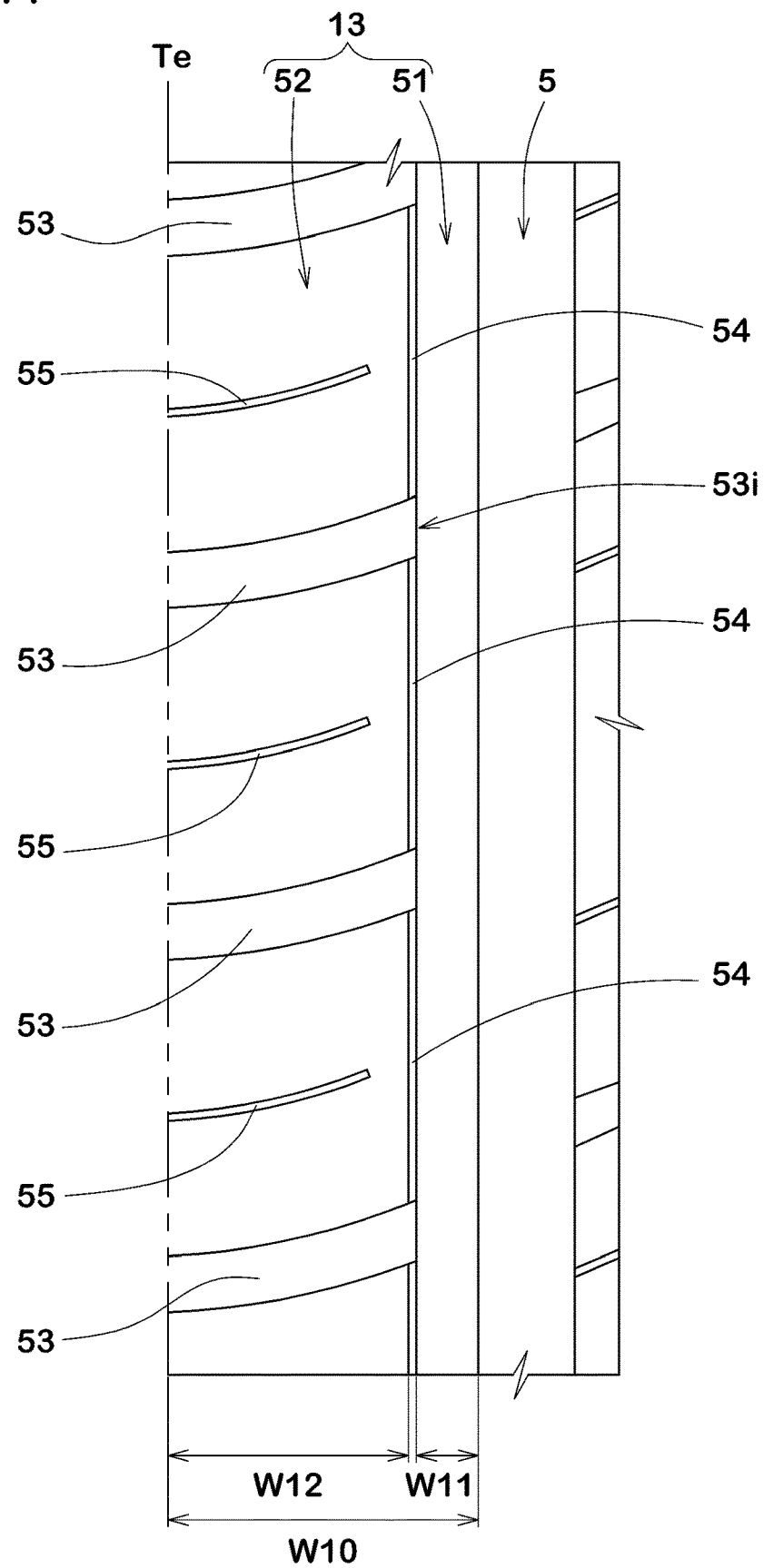
FIG. 11 is an enlarged view of a third land portion illustrated in FIG. 1.

FIG. 11 illustrates an enlarged view of one of the third land portions 13. The axial width W10 of the third land portion 13, for example, is in a range of from 0.15 to 0.25 times the tread width TW.

The third land portion 13 includes a rib region 51 and a block region 52. The rib region 51 extends continuously in the circumferential direction of the tire. The block region 52 includes a plurality of circumferentially arranged blocks divided by a sipe and a lateral groove.

The ratio W11/W12 of the axial width W11 of the rib region 51 to the axial width W12 of the block region 52 is preferably in a range of not less than 0.2, more preferably not less than 0.23, but preferably not more than 0.3, more preferably not more than 0.27. These rib region 51 and block region 52 may improve wandering performance while maintaining steering stability.

The third land portion 13 is provided with a tread edge lateral groove 53, a longitudinal sipe 54 and a lateral sipe 55.

The tread edge lateral groove 53, for example, extends axially inwardly from the tread edge Te, at least. Preferably, the tread edge lateral groove 53 terminates within the third land portion 13. The tread edge lateral groove 53 according to the embodiment is curved smoothly. Such a tread edge lateral groove 53 may achieve steering stability with wandering performance.

The longitudinal sipe 54, for example, connects between the tread edge lateral grooves 53 and 53. The longitudinal sipe 54 is connected to the axially inner ends 53i of the tread edge lateral grooves 53. Such a longitudinal sipe 54 may improve cornering performance on icy road.

The lateral sipe 55, for example, is arranged between a pair of the tread edge lateral grooves 53 and 53, and extends parallel to the tread edge lateral grooves 53. The lateral sipe 55, for example, extends axially inwardly from the tread edge Te at least, and terminates within the third land portion 13. Such a lateral sipe 55 may improve wandering performance.

While the embodiments in accordance with the present invention have been described in detail, the present invention is not limited to the illustrated embodiments, but can be modified and carried out in various aspects. For example, the first land portion 11 and the second land portion 12 may be arranged on both sides of a main groove except the crown main groove 4.

Example

Pneumatic tires having a size 225/65R17 and a basic tread pattern illustrated in FIG. 1 were manufactured based on details shown in Table 1. For the reference example 1, a tire having the basic tread pattern illustrated in FIG. 1 without having any recesses was manufactured. These tires were installed to the following test vehicle, and then steering stability on dry road and on-snow performance were tested. The common specification of each test tire and the test methods are as follows.

Rim: 17×6.5J
Tire inner pressure: 220 kPa
Test vehicle: Four wheel drive vehicle with a displacement of 2,400 cc
Tire installing location: All wheels
Steering Stability on Dry Road:
Steering stability in which the test vehicle was run on a test course of a dry asphalt road was evaluated by a driver's feeling. The results were indicated using an index based on Ref. 1 being 100. The larger the value, the better the steering stability on dry road is.
On-Snow Performance:
On-snow performance I which the test vehicle was run on a snowy road was evaluated by a driver's feeling. The results were indicated using an index based on Ref. 1 being 100. The larger the value, the better the on-snow performance is.
The test results are shown in Table 1.

TABLE 1

|  | Ref. 1 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Recess | None | Presence | Presence | Presence | Presence | Presence | Presence | Presence | Presence |
| Recess width W1/Land portion width W2 | — | 0.30 | 0.30 | 0.20 | 0.20 | 0.20 | 0.30 | 0.60 | 0.60 |
| Recess width W1/Recess length L1 | — | 0.20 | 0.20 | 0.20 | 0.18 | 0.18 | 0.20 | 0.20 | 0.28 |
| Recess maximum depth d1/Main groove depth d2 | — | 0.60 | 0.95 | 0.95 | 0.95 | 0.95 | 0.30 | 0.30 | 0.30 |
| Vertex angle θ1 of bottom surface of recess (deg.) | — | 20 | 20 | 20 | 20 | 20 | 20 | 20 | 20 |
| Edge side angle θ2 of bottom surface of recess (deg.) | — | 60 | 60 | 60 | 60 | 60 | 60 | 60 | 60 |
| Inclination angle θ3 of bottom surface of recess (deg.) | — | 10 | 10 | 10 | 10 | 10 | 10 | 10 | 10 |
| Circumferential distance between first recess and second recess/Main groove width W1 | — | 1.00 | 1.00 | 1.00 | 1.00 | 1.10 | 1.00 | 1.00 | 1.00 |
| Steering stability on dry road (Score) | 100 | 99 | 96 | 97 | 96 | 98 | 100 | 96 | 99 |
| On-snow performance (Score) | 100 | 115 | 115 | 109 | 110 | 108 | 106 | 110 | 107 |

|  | Ex. 9 | Ex. 10 | Ex. 11 | Ex. 12 | Ex. 13 | Ex. 14 | Ex. 15 | Ex. 16 | Ex. 17 |
| --- | --- | --- | --- | --- | --- | --- | --- | --- | --- |
| Recess | Presence | Presence | Presence | Presence | Presence | Presence | Presence | Presence | Presence |
| Recess width W1/Land portion width W2 | 0.60 | 0.30 | 0.30 | 0.30 | 0.30 | 0.30 | 0.30 | 0.30 | 0.30 |
| Recess width W1/Recess length L1 | 0.28 | 0.20 | 0.20 | 0.20 | 0.20 | 0.20 | 0.20 | 0.20 | 0.20 |
| Recess maximum depth d1/Main groove depth d2 | 0.30 | 0.50 | 0.65 | 0.80 | 0.60 | 0.60 | 0.60 | 0.60 | 0.60 |
| Vertex angle θ1 of bottom surface of recess (deg.) | 20 | 20 | 20 | 20 | 20 | 20 | 20 | 20 | 10 |

TABLE 1-continued

| | | | | | | | | | |
|---|---|---|---|---|---|---|---|---|---|
| Edge side angle θ2 of bottom surface of recess (deg.) | 60 | 60 | 60 | 60 | 60 | 60 | 60 | 60 | 60 |
| Inclination angle θ3 of bottom surface of recess (deg.) | 10 | 10 | 10 | 10 | 10 | 10 | 10 | 10 | 10 |
| Circumferential distance between first recess and second recess/Main groove width W1 | 0.70 | 1.00 | 1.00 | 1.00 | 0.90 | 0.95 | 1.05 | 1.10 | 1.00 |
| Steering stability on dry road (Score) | 100 | 99 | 99 | 97 | 97 | 98 | 99 | 99 | 100 |
| On-snow performance (Score) | 106 | 110 | 115 | 115 | 115 | 115 | 112 | 113 | 110 |

| | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|
| Recess | Presence | Presence | Presence | Presence | Presence | Presence | Presence | Presence | Presence |
| Recess width W1/Land portion width W2 | 0.30 | 0.30 | 0.30 | 0.30 | 0.30 | 0.20 | 0.40 | 0.30 | 0.30 |
| Recess width W1/Recess length L1 | 0.20 | 0.20 | 0.20 | 0.20 | 0.20 | 0.20 | 0.20 | 0.15 | 0.25 |
| Recess maximum depth d1/Main groove depth d2 | 0.60 | 0.60 | 0.60 | 0.60 | 0.60 | 0.60 | 0.60 | 0.60 | 0.60 |
| Vertex angle θ1 of bottom surface of recess (deg.) | 30 | 20 | 20 | 20 | 20 | 20 | 20 | 20 | 20 |
| Edge side angle θ2 of bottom surface of recess (deg.) | 60 | 50 | 70 | 60 | 60 | 60 | 60 | 60 | 60 |
| Inclination angle θ3 of bottom surface of recess (deg.) | 10 | 10 | 10 | 5 | 15 | 10 | 10 | 10 | 10 |
| Circumferential distance between first recess and second recess/Main groove width W1 | 1.00 | 1.00 | 1.00 | 1.00 | 1.00 | 1.00 | 1.00 | 1.00 | 1.00 |
| Steering stability on dry road (Score) | 98 | 98 | 98 | 99 | 97 | 99 | 97 | 99 | 98 |
| On-snow performance (Score) | 120 | 114 | 116 | 110 | 115 | 111 | 115 | 112 | 114 |

From the test results, it was confirmed that the example pneumatic tires shown in Table 1 have achieved steering stability on dry road with on-snow performance.

Pneumatic tires having a size 225/65R17 and a basic tread pattern illustrated in FIG. 1 were manufactured based on details shown in Table 1. For the reference example 2, a tire having the basic tread pattern illustrated in FIG. 1 without having any second recesses was manufactured. These tires were installed to the following test vehicle, and then wear resistance performance on dry road and on-snow performance were tested. The common specification of each test tire and the test methods are as follows.

Rim: 17×6.5J
Tire inner pressure: 220 kPa
Test vehicle: Four wheel drive vehicle with a displacement of 2,400 cc
Tire installing location: All wheels Wear Resistance Performance:

A wear amount of the middle land portion was measured after traveling on a test course of a dry asphalt road for a certain distance. The results were reciprocals of the wear amounts, and were indicated using an index based on Ref. 1 being 100. The larger the value, the better the wear resistance performance is.

On-Snow Performance:

On-snow performance in which the test vehicle was run on a snowy road was evaluated by a driver's feeling. The results were indicated using an index based on Ref. 1 being 100. The larger the value, the better the on-snow performance is.

The test results are shown in Table 2.

TABLE 2

| | Ref. | Ex. 27 | Ex. 28 | Ex. 29 | Ex. 30 | Ex. 31 | Ex. 32 | Ex. 33 | Ex. 34 |
|---|---|---|---|---|---|---|---|---|---|
| Second recess | None | Presence | Presence | Presence | Presence | Presence | Presence | Presence | Presence |
| Lug groove arrangement pitches L5/Second land portion width W4 | 2.6 | 2.6 | 2.6 | 2.6 | 2.6 | 2.6 | 2.6 | 2.6 | 2.6 |
| Distance between second recess and lug groove L9/Lug groove arrangement pitches L5 | — | 0.35 | 0.5 | 0.45 | 0.25 | 0.2 | 0.35 | 0.35 | 0.35 |
| Distance between lug groove and lateral groove L8/Lug groove arrangement pitches L5 | — | 0.45 | 0.45 | 0.45 | 0.45 | 0.45 | 0.3 | 0.35 | 0.55 |
| Connection sipe | Presence | Presence | Presence | Presence | Presence | Presence | Presence | Presence | Presence |
| Inclined sipe | Presence | Presence | Presence | Presence | Presence | Presence | Presence | Presence | Presence |
| Wear resistance performance (Index) | 100 | 100 | 98 | 100 | 100 | 99 | 98 | 100 | 100 |
| On-snow performance (Index) | 100 | 110 | 110 | 110 | 110 | 106 | 110 | 110 | 110 |

| | Ex. 35 | Ex. 36 | Ex. 37 | Ex. 38 | Ex. 39 | Ex. 40 | Ex. 41 | Ex. 42 |
|---|---|---|---|---|---|---|---|---|
| Second recess | Presence | Presence | Presence | Presence | Presence | Presence | Presence | Presence |
| Lug groove arrangement pitches L5/Second land portion width W4 | 2.6 | 1.9 | 2.0 | 3.3 | 3.4 | 2.6 | 2.6 | 2.6 |

TABLE 2-continued

| | | | | | | | | |
|---|---|---|---|---|---|---|---|---|
| Distance between second recess and lug groove L9/Lug groove arrangement pitches L5 | 0.35 | 0.35 | 0.35 | 0.35 | 0.35 | 0.35 | 0.35 | 0.35 |
| Distance between lug groove and lateral groove L8/Lug groove arrangement pitches L5 | 0.6 | 0.45 | 0.45 | 0.45 | 0.45 | 0.45 | 0.45 | 0.45 |
| Connection sipe | Presence | Presence | Presence | Presence | Presence | None | Presence | None |
| Inclined sipe | Presence | Presence | Presence | Presence | Presence | None | None | Presence |
| Wear resistance performance (Index) | 98 | 98 | 100 | 100 | 100 | 102 | 101 | 101 |
| On-snow performance (Index) | 110 | 110 | 110 | 110 | 106 | 107 | 109 | 108 |

From the test results, it was confirmed that the example pneumatic tires shown in Table 2 have improved on-snow performance while maintaining wear resistance performance.

The invention claimed is:

1. A pneumatic tire comprising:
a tread portion being provided with a plurality of circumferentially and continuously extending main grooves that comprise a pair of crown main grooves disposed on each side of the tire equator and a pair of shoulder main grooves disposed axially outside the crown main grooves, wherein a first land portion is formed between the crown main grooves and a pair of second land portions are each formed between the respective shoulder main groove and the crown main groove on each side of the tire equator;
a plurality of recesses being provided on the first land portion, the recesses comprising a plurality of recesses provided on a first axial side edge of the first land portion and a plurality of recesses provided on a second axial side edge of the first land portion that is axially opposite to the first axial side edge;
wherein
each recess provided on the first axial side edge is arranged so as not to overlap with each projected region of each recess provided on the second axial side edge, wherein each projected region is projected onto the first axial side edge in an axial direction of the tire,
each second land portion is provided with
a plurality of lug grooves extending axially outwardly from the crown main groove and terminating within the second land portion,
a plurality of lateral grooves extending axially inwardly from the shoulder main groove and terminating within the second land portion and
a second recess provided between a pair of circumferentially adjacent lug grooves on an edge on the side of the crown main groove of the second land portion,
wherein
the lug grooves and the lateral grooves are arranged alternately in a circumferential direction of the tire,
the lateral grooves comprise an inclined portion having an angle with respect to the circumferential direction of the tire wherein the angle gradually decreases axially inwardly, and the second land portion is provided with a connection sipe connecting between the second recess and the inclined portion,
the second recess comprises a substantially triangular recess bottom surface, the recess bottom surface being smoothly connected to a ground contact surface of the second land portion, and the recess bottom surface extending toward a bottom of the second recess while increasing a depth of the second recess and reducing a width of the recess bottom surface in the axial direction of the tire from the ground contact surface toward the bottom,
the recess bottom surface comprises a first side extending on a sidewall of the second land portion, a second side to define a boundary with respect to the ground contact surface, and a third side disposed between the first side and the second side, and the first side has a length greater than that of the third side.

2. The pneumatic tire according to claim 1, wherein an angle between the second side and the third side is an obtuse angle.

3. The pneumatic tire according to claim 1, wherein the second recess comprises a recess sidewall extending radially outwardly from the third side in a substantially planar shape.

4. The pneumatic tire according to claim 1, wherein a depth of the inclined portion gradually increases axially outwardly.

5. The pneumatic tire according to claim 1, wherein circumferential arrangement pitches of lug grooves are greater than an axial width of the second land portion.

6. The pneumatic tire according to claim 5, wherein the arrangement pitches are in a range of from 2.0 to 3.3 times the axial width of the second land portion.

7. The pneumatic tire according to claim 1, wherein an inclined sipe extending axially inwardly from the shoulder main groove and terminating within the second land portion is provided.

8. The pneumatic tire according to claim 1, wherein each of the plurality of recesses and the second recess has a ratio W1/L1 of an axial width W1 thereof to a circumferential length L1 thereof being in a range of from 0.15 to 0.25.

9. The pneumatic tire according to claim 1, wherein the lateral grooves comprise an inclined portion having an angle with respect to the circumferential direction of the tire wherein the angle gradually decreases axially inwardly.

10. The pneumatic tire according to claim 1, wherein each lug groove is bent so as to include a first portion located axially inward of a bent portion and a second portion located axially outward of the bent portion,
an angle of the first portion is in a range of from 30 to 70 degrees with respect to the circumferential direction of the tire, and
the second portion is inclined at an angle with respect to the circumferential direction of the tire greater than that of the first portion.

* * * * *